UNITED STATES PATENT OFFICE.

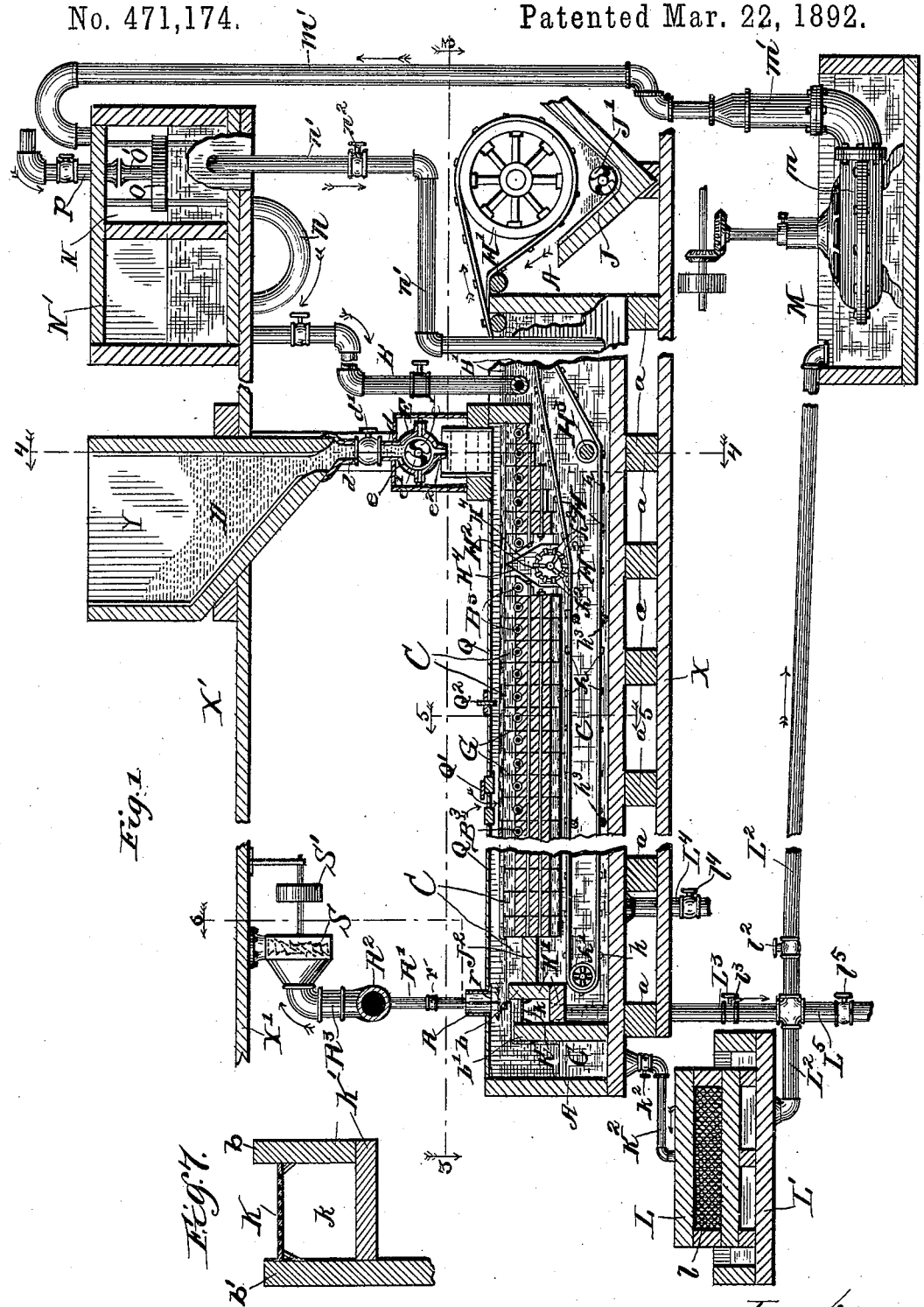

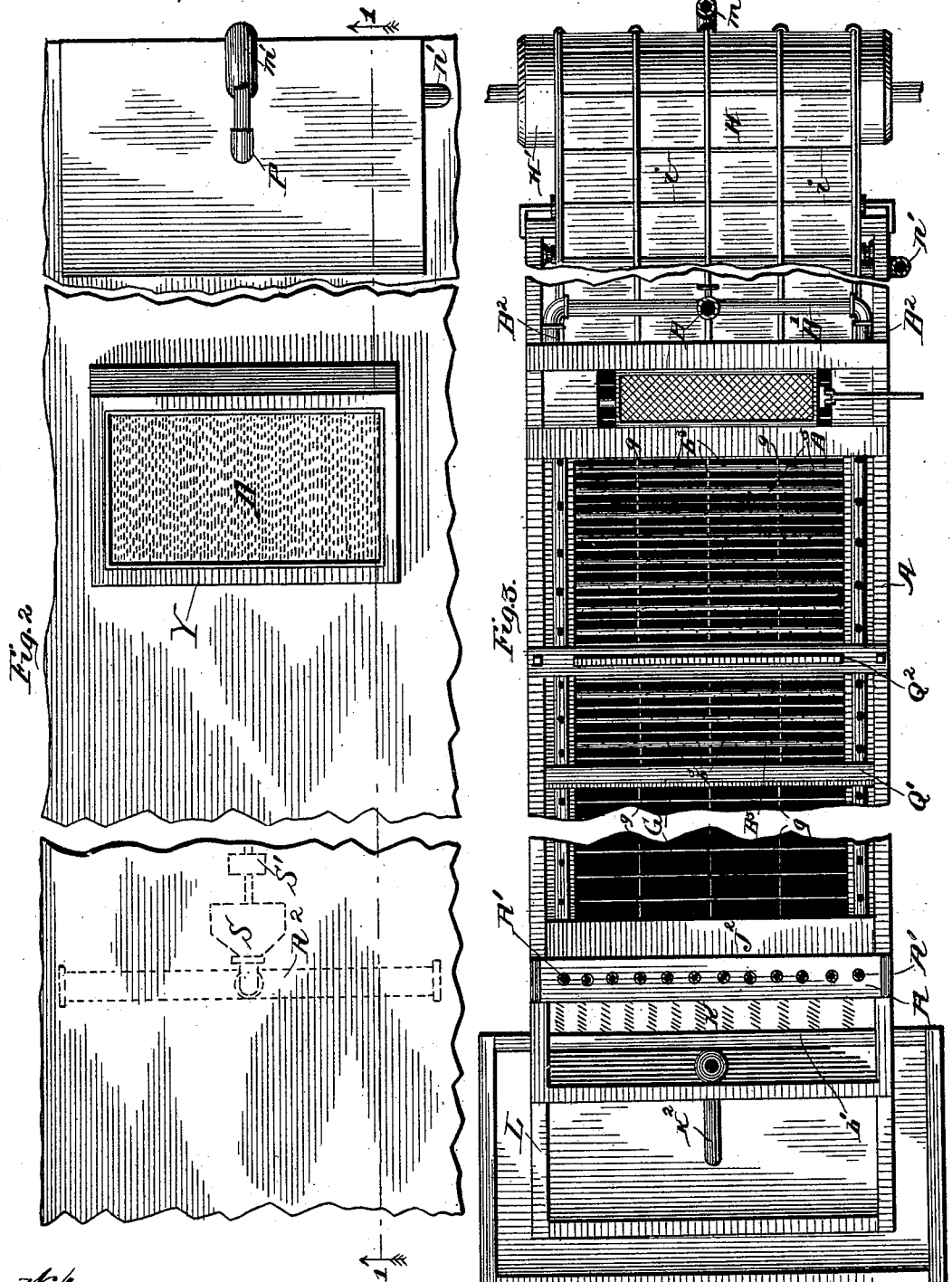

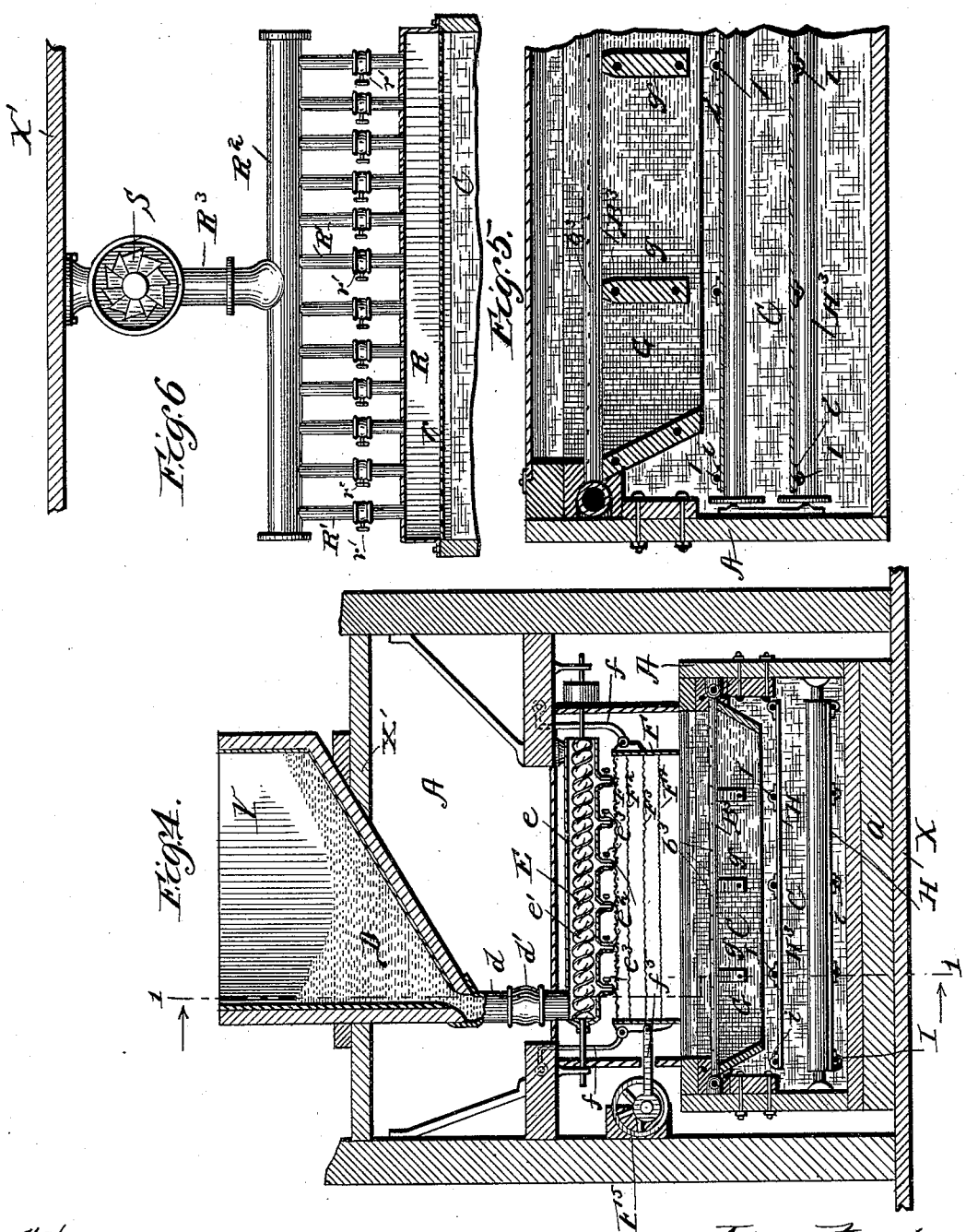

CHARLES B. HEBRON AND CARRIE J. EVERSON, OF DENVER, COLORADO.

PROCESS OF CONCENTRATING ORES.

SPECIFICATION forming part of Letters Patent No. 471,174, dated March 22, 1892.

Application filed September 1, 1891. Serial No. 404,400. (No model.)

*To all whom it may concern:*

Be it known that we, CHARLES B. HEBRON and CARRIE J. EVERSON, both residents of Denver, in the county of Arapahoe and State of Colorado, have made new and useful Improvements in Processes for the Concentration of Certain Ores; and we do declare the following to be a full, clear, and exact description of the invention, such as will enable those skilled in the art to which it appertains to practice the same.

Our invention relates to the concentration of ores, and has for its object the successful and economical separation of the lighter metals and minerals from their associate rock, many of which have never heretofore been successfully separated by mechanical processes—that is, processes wherein the relative specific gravity of the ore values, the rock-matrix of the ore, and the suspensive fluid in which the separation has been attempted have been relied upon for effecting by means of many different mechanical appliances the desired separation of such values from the rock-matrix of the ore.

The failures resulting from the heretofore-known processes may be briefly stated to be due to the effort of inventors of mechanical processes and builders of ore-separators to obtain the desired concentration with processes and machines based upon the theory contained in the statement by text authorities that all metals and minerals are of greater specific gravity than the rock portion of their respective ores, such statement being misleading and untrue because of the porosity of structure and irregularity of form which exists in metallic and mineral particles contained in certain ores whereof the rock-matrix is crystalline, such rock particles having smooth and glassy surfaces, as we have discovered by an extended series of microscopical examinations, wherein the ore examined has been first pulverized to a degree of fineness permitting it to pass through the meshes of a series of Swiss bolting-cloth screens of a mesh varying from one hundred to one hundred and eighty meshes per linear inch and then examining the mineral, metallic, and rock particles of the ore with a microscope producing an enlargement of at least three thousand diameters, and the process embodying our invention has particular reference to the separation or concentration of such ores.

The form and structure of the mineral and metallic particles adapted when contained in a suitable crystalline rock-matrix to be separated by our process is amply illustrated and particularly noticeable in bismuth, silver, copper carbonate, silver chloride, gray copper, ruby silver, tellurides, copper and silver glances, as well as other forms of black sulphurets, wire silver, nearly all native silver, flake and flour gold, and frequently coarser particles of free gold, such mineral and metallic particles being irregular in form, with cavities or depressions on the surfaces thereof, and porous in structure, frequently resembling in appearance coral or sponge or vegetable fibers, as sprigs of moss or segments of fronds. Further, there is a type of ores made up of an argentiferous class of minerals associated with a tough crystalline rock, especially noticeable in spar-gangue carrying gray copper, in which the mineral does not exist in minute particles or in intimate dissemination through the rock, but in coarse particles widely separated from each other and of an extremely rigid though friable texture, for the concentration of which our process is well adapted. In the operation of pulverizing this ore sufficiently to liberate the mineral contained therein, though only a coarse pulverization is required, the mineral becomes reduced to an almost impalpable slime, the particles thereof being sufficiently fine for the requirements of this process. We have also discovered that the buoyancy of the above-named minerals and metallic particles or the tendency of such particles to remain suspended in fluid may be so increased by applying thereto properly-prepared buoyant material in a suitable way and under such pressure as to cause particles thereof to adhere to the irregular surfaces and to be contained or pressed into the cavities or pores of such mineral and metallic particles that they will not only remain suspended in fluid for much longer time than would the mineral and metallic particles when not joined to particles of buoyant material, but also to float upon the surface of liquid for a sufficient time to be separated from the rock-matrix of the ore by such rock-matrix settling through such liquid. In practicing this invention such properly-prepared buoyant material is evenly distributed with the ore particles by means of shaking or revolving screens or of equivalent mechanical devices, and the mixture so obtained is then submitted to a rubbing movement and pressure, the result being that the particles of buoyant material are pressed into the cavities and pores, or partially so, of the mineral and metallic particles and made to adhere to the rough and irregular surfaces thereof, and they (the joined mineral and metallic particles of the ore and buoyant material) are of less specific gravity for a time than the rock particles of such ore.

We have found ordinary mill-burrs to be effective in the operation of attaching the particles of buoyant material to the metallic and mineral particles of disintegrated ore.

The amount of buoyant material to be added to a given quantity of pulverized ore must be determined by the bulk of the metal or mineral contained in such ore. Experience has shown us that if the amount of foreign buoyant material added to the disintegrated ore be equal to or slightly in excess of the bulk of metal or mineral contained in such ore a sufficient buoyancy will thereby be imparted to the metal and mineral particles after thus joining to admit of their obtaining the upper strata when such prepared ore-stock is submitted to stratifying agencies.

The following list comprises a number of materials which are typical of the substances that may be employed to render metallic and mineral particles buoyant: Charcoal, coke, lamp-black, plumbago, any of the friable vegetable fibers—such as bark, moss, straw, cotton, wool—also sulphur, (sublimed,) aluminum trihydrate, hydrated lime sulphate, sodium oleate and other cheap salts of sodium, also the cheap metallic sulphates and oleates. These salts must be dry not only in the ordinary sense, but entirely dehydrated, so as to render them amorphous. The carbonaceous substances are first named because of their cheapness, their positiveness of action, and their destructibility in the furnace. Sulphur also acts as a fuel and in the free state and proper quantity for carrying out the process would be unobjectionable to the smelter. Lime salts acting as oxidizing fluxes need no consideration, nor do the soluble salts, as they are easily removed from the concentrates before smelting. In operating with soluble salts the water employed in the separator-tank, hereinafter described, must be saturated either with the same salt or with one which will preserve the same conditions—that is, remain incapable of dissolving or reacting chemically upon the salt mixed with the ore and attached to the metallic and mineral particles thereof. To this rule we make certain exceptions—to wit, cases where the newly-formed substance is able to take the place of the one destroyed, as in the case of sodium oleate reacting to form oleic acid or any other oleate or in the case of common alum acting to form aluminium hydrate.

The terms "oleic acid" and "oleate" are here used to embrace the mixed fatty acids and their salts resulting from the decomposition of commercial soaps.

The degree of fineness to which the ore must necessarily be pulverized before the "buoy-stock" (as we shall hereinafter term the buoyant material) is joined thereto is determined by the character of the ore and the manner in which the mineral and metallic particles are disseminated in the rock-matrix of the ore.

While some of the lighter class minerals are found sparsely and intimately disseminated with the rock-matrix of their respective ores and the particles of minerals so minute as to require a pulverization which is commercially impracticable, yet in nearly all cases where the metallic and mineral particles are found in a crystalline rock-matrix constituting an ore otherwise suitable for separation by our process we have found that a pulverization of from ninety to one hundred and sixty mesh, such pulverization being eminently practicable, effectually pulverizes the ore to a degree of fineness which liberates the values from their envelopment.

In cases where vegetable fiber or any of the carbonaceous substances are used as a buoy-stock they, together with the disintegrated ore, must be dry before the two are mixed preparatory to the joining of the metallic and mineral particles to and with the buoy-stock. In cases where the chemically-prepared buoy-stock is used the ore and the buoy-stock may be mixed or distributed together in the presence of moisture; but the operation of attaching the buoyant material to the metallic and mineral particles of the ore must be performed after the entire mass thus distributed together has been thoroughly dried.

As our process is only adapted to separate the metallic and mineral particles from a crystalline rock, (an ore with a rock-matrix of crystals, as a pure and translucent quartz, or a crystalline spar-gangue being particularly favorable,) no trouble arises in attaching the buoyant material to the metallic and mineral particles of the pulverized ore from any tendency of the buoyant material to adhere to the surface of the rock particles, as the faces of the rock particles are smooth and glassy and offer no position of lodgement for such buoyant material.

We do not claim any value for this process if it be applied to an ore with a talc or clayey gangue, or, except for the separation of the lighter mineral and metallic particles, when applied to an ore containing galena or pyrites of cubical formation.

When ores adapted for treatment by this process are prepared in the foregoing manher, a separation may be effected with more or less perfection if the thus-prepared stock be submitted to any of the standard dry or wet concentrators. In case a dry separator be used the buoyed values of the ore-stock will attain the position reached by the gangue when the conventionally-prepared ore-stock is put in the machine, and the rock particles will be delivered to the position that the product is delivered in such cases, and if the ore-stock prepared by our method is delivered by means of sifting or blowing to the surface of the water contained in or upon wet concentrators the reverse of position to that of the product and waste of the ordinarily-prepared ore-stock in the use of the machine is attained by the product and the waste. Repeated experiments have proven to us that the standard concentrators in use— such as air-jigs, oscillating tables, wet jigs, frue vanners, or percussion-tables—may be adjusted to admit of a fairly good separation; but there are mechanical barriers to the perfect separation, or, more particularly, to the rapid and economical operation of the same. Therefore we submit a description of a device, the invention of Charles B. Hebron, peculiarly suited to the successful operation of separating the buoyed values from the rock particles of the ore-stock as prepared in the hereinbefore-described manner and an illustration of such device in the drawings accompanying and forming a part of this specification, in which—

Figure 1 is a longitudinal sectional view of a liquid-separator on line 1 1 of Fig. 2, viewed in the direction indicated by the arrows; Fig. 2, a plan view; Fig. 3, a horizontal sectional view on line 3 3 of Fig. 1, viewed in the direction indicated by the arrows, the top of the tank of the separator being transparent and so exposing to view the several parts contained in the tank; Fig. 4, a vertical cross-section on line 4 4 of Fig. 1, viewed in the direction indicated by the arrows; Fig. 5, a vertical cross-section, on an enlarged scale, of a portion of the device on line 5 5 of Fig. 1, viewed in the direction indicated by the arrows; Fig. 6, a vertical cross-section on line 6 6, Fig. 1, also viewed in the direction indicated by the arrows; and Fig. 7, a detail view of the foraminated plate (illustrated in Fig. 1) near the tail end of the tank of the separator, and hereinafter termed a "perforated table."

The same letter of reference is used to indicate a given part where more than one view thereof is shown.

X X' are floors of the building in which the separator is placed.

Y is the storage for the ore-stock which is to be run through the separator.

A is a tank adapted to hold liquid, constructed of any suitable material, but preferably of wood, and rectangular in shape, with its greatest length from the head to the tail.

$a\ a$ are timbers resting on the floor X, extending transversely across between the tank A and the floor X, on which timbers the tank rests.

The liquid contained in the tank, preferably water or brine—that is, water saturated with common salt—is supplied thereto through the pipe B at the head end of the tank and is ultimately discharged over the bridge walls or partitions $b\ b'$ at the tail end of the tank. Such liquid is lettered C. The pipe B extends downward to underneath the surface of the liquid C in the tank and at its lower end is connected with a series of horizontal pipes consisting of transverse pipe $B'$, longitudinal pipe $B^2$, and smaller transverse pipes $B^3\ B^3$.

$b^3\ b^3$ are perforations on the upper half of each of the transverse pipes $B^3\ B^3$, through which the liquid C enters the tank, there being sufficient head in the pipe B to force the liquid out of the perforations in a manner to produce a slight effervescing condition in such liquid directly over such perforations.

D is the ore-stock, properly prepared, contained in the storage Y.

$d$ is a pipe having valve $d'$ therein, extending from storage Y to transverse conveyer E. Conveyer E consists of tube or trough $e$ and conveyer-screw $e'$, nipples $e^2\ e^2$, extending downward from tube or trough $e$, and valves $e^3\ e^3$ in such nipples.

$e^4$ is a driving-pulley on the shaft of the conveyer-screw by which such conveyer-screw is turned.

F is an oscillating frame suspended on vibratory arms $f\ f$, adapted to be rapidly moved a slight distance backward and forward or oscillated by the cam-wheel $F^5$ through connecting-arm $f^5$.

$F'\ F^2\ F^3\ F^4$, respectively, are screens in frame F, forming a series of screens through which the ore-stock D, delivered from the nipples $e^2\ e^2$ on the upper one thereof, passes just prior to its delivery to the surface of the liquid C in the tank A.

The purpose of the several mechanisms between the storage Y and the tank A is to insure the taking of the prepared ore-stock D from such storage and the delivery of the same to the surface of the liquid C in the form of a dust-cloud, whereby a thin surface charge of prepared ore-stock shall be obtained on the liquid C, near the head of the tank A, underneath the lower one of the screens forming the series. The ore-stock thus delivered to and contained on the surface of the liquid C in the tank A and consisting of the pulverized and buoyed values and the pulverized rock matrix or gangue are separated from each other in the tank, the purpose of the several mechanisms contained in the tank being to so separate the buoyed values in such ore-stock from the gangue thereof and to deliver such buoyed values at or near the tail end of the tank and to deliver the gangue of the ore-stock from the head end of the tank.

G G G are vertical partitions extending transversely across the tank, the upper edge of each partition being a slight distance below the surface of the liquid C and the lower edge a short distance above an endless apron-belt, by which apron-belt the gangue settling through the liquid is carried from the tank.

$g$ $g$ are braces extending between partitions G G, respectively.

H is such endless apron-belt having taut cleats $h$ $h$ $h$ thereon and longitudinal ropes I I fastened thereto by the straps $i$ $i$, such straps being, preferably, sewed to the belt H. Apron-belt H extends longitudinally through the tank and out therefrom over the edge of the head end thereof, and from thence over the drum H′, by which drum it is moved.

The upper and carrying portion of the apron-belt H for the greater part of the length thereof is substantially horizontal, being held in position at the point of junction of the horizontal part extending along in the tank with the inclined part extending out of the tank over the edge of the head thereof by the sprocket-reel $H^2$, having projections $h^2$ $h^2$ thereon, and the horizontal position of the remainder of the carrying portion of the belt is obtained by such apron-belt extending around the roller or drum $h'$ and idlers $h^3$ $h^3$. The lower or ingoing portion of the endless apron-belt is held in place by the roller or drum $H^3$. To prevent any possible disturbance of the surface of the liquid C by the movement of the sprocket-reel $H^2$ there is placed over it the housing $H^4$.

J is a spout or trough underneath the drum H′, adapted to receive the gangue delivered from the endless apron-belt H as such belt travels around the drum H′, and J′ is a common screw conveyer by which the spout or trough J is emptied.

$J^2$ is a horizontal planking forming a cover for the endless apron-belt at the tail end of the tank and also forming on the upper surface thereof a horizontal bed by which, from inspection of the settlings thereon, if any, the presence of gangue in the liquid about to pass over the bridge-wall $b$ can be determined.

K is a perforated table forming a sieve, through which the greater part of the liquid passing over the bridge-wall $b$ can pass into chamber $k$, such chamber $k$ being formed by planking K′ and bridge-walls $b$ $b'$. The liquid passing over the bridge-wall $b'$, carrying on the surface thereof the buoyed mineral and metallic particles from the ore-stock, flows through the pipe $K^2$ into receptacle L.

$l$ $l$ are screens in receptacle L, through which the liquid passing into such receptacle can pass into receptacle L′, thereby leaving the buoyed mineral and metallic particles in the receptacle L, from which they are taken to be afterward treated in any desired manner.

$L^2$ is a pipe extending from receptacle L′ to and communicating with receptacle M, and $l^2$ is a valve in pipe $L^2$.

$L^3$ is a pipe which extends from chamber $k$ to pipe $L^2$ and is joined to pipe $L^2$ by means of a common T-joint, and pipe $L^5$ extends from pipe $L^2$, forming a continuation of pipe $L^3$.

$l^5$ is a valve in pipe $L^5$.

When valve $l^2$ in pipe $L^2$ or valve $l^5$ is open and valve $l^3$ in pipe $L^3$ is also open, the liquid in chamber $k$ can pass therefrom through the pipe $L^3$. The proportion of the liquid passing over the screen K which is permitted to pass through such screen into chamber $k$, and from thence through pipe $L^3$, is determined by the valve $l^3$, and the direction such escaping liquid flows is determined by the valves $l^2$ and $l^5$, respectively—as, for instance, closing valve $l^5$ and opening valve $l^2$ guides the liquid into a receptacle, from which it is returned, by means hereinafter described, to the storage-reservoir, from which the pipe B extends, and opening the valve $l^5$ permits the liquid to flow to waste.

When it is desired to empty the tank A of the liquid contained therein without allowing such liquid to pass over the bridge-walls $b$ $b'$, as for cleaning out the tank or flushing it, the valve $l^4$ in pipe $L^4$ is opened; but ordinarily valve $l^4$ is maintained in a closed condition.

$m$ is a centrifugal pump in receptacle M, and $m'$ is a pipe from the centrifugal pump $m$ to the tank N. The liquid flowing into receptacle M through pipe $L^2$ is forced by the pump $m$ into tank N through pipe $m'$.

O is a float-valve in tank N, and O′ is the stem thereof, adapted to close the pipe P (such pipe P extending from a liquid-supply) when the liquid contained in the tank N is raised a determined amount and to open such pipe when less than the determined amount of liquid is contained in such tank. By means of this valve O the pipe P when the liquid returned to the tank N through the pipe $m'$ is insufficient to maintain the desired height of liquid in tank N the additional liquid required is automatically supplied through the pipe P.

N′ is the liquid-storage tank from which the liquid is taken through the pipe B to supply the tank A, and $n$ is a pipe connecting the tank N with tank N′. The use of pipe $n$ is to prevent any pulsation in tank N′ from the movement of the centrifugal pump M or the water passing therethrough into tank N.

In order to supply liquid directly to tank A from tank N, as in the case of desiring to flush the bottom of the tank A, supply-pipe $n'$, having valve $n^2$ therein, is connected at its upper end with the storage-receptacle N and at its lower end with the tank A.

Q is the cover of the tank A, and Q′ is a slide in cover Q, which can be moved to produce an opening of any desired size in the cover Q.

$Q^2$ is a partition extending transversely across the tank A from the cover Q to near the surface of the liquid C in the tank.

The slide Q' and the partition Q² are adjustable, the joint functions of the two being to determine the quantity of air drawn through the tank by the fan S and its source—that is, when the slide Q² is near the surface of the liquid C in the tank and the slide Q' is opened widely nearly all the air passing through the tank will pass through the opening covered by the slide Q', and a small portion thereof will be supplied underneath the slide or partition Q², while a larger quantity of air will pass under the partition Q² if such partition be raised farther away from the liquid C. The partition Q² has another function—namely, to deflect all, if any, particles of ore-stock floating above the liquid C (in the air between the surface of liquid C and cover Q) downward to the surface of such liquid as it passes underneath the slide Q².

R is a chamber extending transversely across the tank near the tail end thereof, and r is a perforated screen between the chamber R and the tank A.

R' R' are a series or pipes extending from the chamber R to the transverse pipe or conduit R², and r' r' are valves in pipes R' R', respectively.

R³ is a pipe extending from the transverse pipe R² to and communicating with the exhaust-fan S.

S' is the driving-pulley by which the exhaust-fan S is rotated.

When the exhaust-fan S is in operation and the slide Q' in cover Q is open, a current of air will extend from the slide Q' over the surface of the liquid contained in the tank, and from thence through the screen into the chamber R, and from thence through the several pipes R', R², and R³ to and through the exhaust-fan S. By means of the series of valves r' r' and the screen r the amount and direction of the moving current of air can be definitely determined, it being understood that the opening of the slide Q' is properly adjusted for the amount of current desired.

In the operation of this device the liquid entering the tank A through the perforations b³ b³ in pipes B³ B³ flows over the top of the partitions G G G along toward the tail end of the tank and over the bridge-wall b, an effervescing movement being produced, as hereinbefore described, in the liquid C over the perforations b³ b³ b³ and a wave-like movement being produced the entire length of the tank by the partitions G G G. The buoyed mineral and metallic particles of the ore-stock will be found floating in the form of a scum upon the surface of the liquid along with such liquid toward the tail end of the tank, and when the exhaust-fan S is in operation the wave-like movement of the surface of the liquid is increased and a movement of such buoyed mineral and metallic particles along upon and over the surface of the liquid C at a rate in excess of the rate of movement of the liquid C is obtained, thereby producing a frictional movement facilitating the separation of such buoyed mineral and metallic particles from the gangue of the ore-stock, whereby the capacity of the separator is increased.

Having thus described our invention, what we claim, and desire to secure by Letters Patent, is—

1. The herein-described process for concentrating ores, which consists in commingling with pulverized ore-stock buoyant material, then submitting the commingled pulverized ore-stock and buoyant material to movement and pressure and so joining the buoyant material to the metallic and mineral particles in the pulverized ore, and then applying the prepared ore while in a dry state to a stratifying apparatus, whereby the buoyed metallic and mineral particles are separated from the gangue by the settling of such gangue, substantially as described.

2. The herein-described process for concentrating ores, which consists in first commingling with pulverized ore-stock buoyant material, then submitting the commingled pulverized ore-stock and buoyant material to movement and pressure and so joining the buoyant material to the metallic and mineral particles in the pulverized ore, and then applying such prepared ore while in a dry state to the surface of liquid, whereby the buoyed metallic and mineral particles are floated on such liquid and separated from the gangue, which settles in the liquid, substantially as described.

3. The process, substantially as described, for concentrating ores, which consists in first joining the metallic and mineral particles in the pulverized ore with a quantity of buoyant material and then sifting or blowing the prepared ore while in a dry state upon the surface of liquid, whereby the buoyed metallic and mineral particles are made to float and thus separate from the gangue, which settles.

4. The herein-described process for concentrating ores, which consists in first joining the metallic and mineral particles in the pulverized ore with a quantity of buoyant material, then sifting or blowing the prepared ore while in a dry state upon the surface of liquid, and then in obtaining a current of air over the liquid, whereby the buoyed metallic and mineral particles are made to float and to move along on and over the surface of such liquid, and thus separate from the gangue, which settles.

5. The herein-described process for concentrating ores, which consists in first joining the metallic and mineral particles in the pulverized ore with a quantity of buoyant material, of obtaining a body of liquid having an effervescent condition, and then sifting or blowing the prepared ore while in a dry state upon the surface of liquid in such effervescing condition, whereby the buoyed metallic and mineral particles are made to float on the surface of such liquid, and thus separate from the gangue, which settles.

6. The herein-described process for concentrating ores, which consists in first joining the metallic and mineral particles in the pulverized ore with a quantity of buoyant material, of obtaining a body of liquid having an effervescent condition, then sifting or blowing the prepared ore while in a dry state upon the surface of liquid in such effervescing condition, and then in obtaining a current of air over the liquid, whereby the buoyed metallic and mineral particles are made to float and to move along on and over on the surface of such liquid, and thus separate from the gangue, which settles.

CHARLES B. HEBRON.
     CARRIE J. EVERSON.

Witnesses to signature of Charles B. Hebron:

CHARLES T. BROWN,
J. L. EVERSON.

Witnesses to signature of Carrie J. Everson:

E. A. FAY,
B. CURTIS.